(12) United States Patent
Yagi et al.

(10) Patent No.: US 7,314,040 B2
(45) Date of Patent: Jan. 1, 2008

(54) FUEL SUPPLY APPARATUS

(75) Inventors: Satoshi Yagi, Kiyosu (JP); Kiyoshi Nagata, Nagoya (JP)

(73) Assignee: Denso Corporation, Kariya, Aichi-pref. (JP)

( * ) Notice: Subject to any disclaimer, the term of this patent is extended or adjusted under 35 U.S.C. 154(b) by 32 days.

(21) Appl. No.: 11/293,197

(22) Filed: Dec. 5, 2005

(65) Prior Publication Data

US 2006/0120893 A1 Jun. 8, 2006

(30) Foreign Application Priority Data

Dec. 3, 2004 (JP) .............................. 2004-351235

(51) Int. Cl.
*F02M 37/04* (2006.01)

(52) U.S. Cl. ...................................... 123/509

(58) Field of Classification Search ................. 123/509
See application file for complete search history.

(56) References Cited

U.S. PATENT DOCUMENTS 5,361,742 A * 11/1994 Briggs et al. ............... 123/506
5,454,697 A * 10/1995 Nakanishi ................. 417/423.3
5,593,287 A * 1/1997 Sadakata et al. ............ 417/366
5,697,769 A * 12/1997 Kobman et al. .......... 417/410.1
5,762,049 A * 6/1998 Jones et al. .................. 123/514
6,062,203 A * 5/2000 Takahashi et al. ........... 123/509
6,308,732 B1* 10/2001 Herndon ...................... 137/560
6,675,778 B1* 1/2004 Kemper et al. .............. 123/516
6,783,336 B2* 8/2004 Kempfer et al. .......... 417/423.1
6,868,834 B1* 3/2005 Mitani et al. ................ 123/495
6,886,542 B2* 5/2005 Yamada et al. .............. 123/509
7,086,493 B2* 8/2006 Knight ......................... 180/274
7,106,593 B2* 9/2006 Stabile et al. ................ 361/707

FOREIGN PATENT DOCUMENTS

JP              6-43834              6/1994

* cited by examiner

*Primary Examiner*—Thomas Moulis
(74) *Attorney, Agent, or Firm*—Nixon & Vanderhye P.C.

(57) ABSTRACT

In a fuel supply apparatus, a circuit module has a housing, a driving circuit contained in the housing, an electric connector. The circuit module is mounted to a cover member that is disposed to close an opening of a fuel tank. A fuel pump is supported by the cover member in the inside of the fuel tank and receives a driving current from the driving circuit. In the circuit module, the electric connector is integrated with the housing. Accordingly, an external size of the circuit module is reduced.

10 Claims, 4 Drawing Sheets

FUEL SUPPLY APPARATUS

CROSS REFERENCE TO RELATED APPLICATION

This application is based on Japanese Patent Application No. 2004-351235 filed on Dec. 3, 2004, the disclosure of which is incorporated herein by reference.

1. Field of the Invention

The present invention relates to a fuel supply apparatus in which a driving circuit of a fuel pump is mounted to a cover member of the fuel tank.

2. Background of the Invention

In a fuel supply apparatus, it is known to fix a driving circuit of a fuel pump, which is installed in the inside of a fuel tank, to a cover member that covers an opening of the fuel tank. In JP-B2-6-43834, for example, a control circuit is laid on a metallic tank cover, which closes the opening of the fuel tank through a heat sink member. Further, a top cover is fixed thereon to cover the control circuit and the heat sink member. In this structure, since the heat sink member, the control circuit and the top cover are fixed one on another on the metallic cover, the structure body on the metallic cover is enlarged.

SUMMARY OF THE INVENTION

The present invention is made in view of the foregoing matter, and it is an object of the present invention to provide a fuel supply apparatus in which a driving circuit of a fuel pump is mounted to a cover member of a fuel tank with a compact structure.

According to the fuel supply apparatus of the present invention, a housing containing a driving circuit is mounted on a cover member that covers an opening of a fuel tank. The driving circuit receives electric power through an electric connector connected thereto, and supplies a driving current to a fuel pump that is supported by the cover member in the inside of the fuel tank. Further, the electric connector is integrated with the housing.

Accordingly, the driving circuit, the housing, and the electric connector are integrated into a circuit module, and mounted on the cover member, thereby reducing the size of structure body on the cover member. In addition, because the driving circuit is located close to the electric connector, a connection distance or a wiring between the driving circuit and the electric connector is shortened. As a result, the driving circuit is easily connected to the electric connector, and the size of the circuit module is further reduced. Also, the integral circuit module is easily fixed to the cover member.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Figure 1:
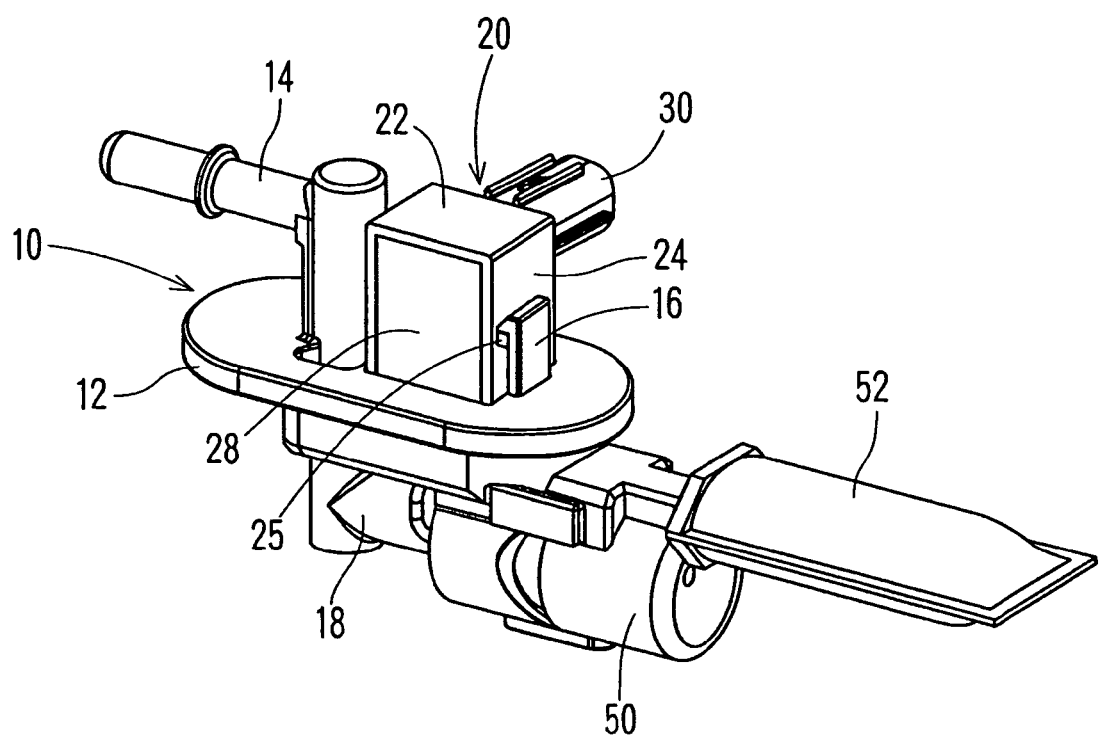
FIG. 1 is a perspective view of a fuel supply apparatus according to a first embodiment of the present invention.

Embodiments of the present invention will be described hereinafter with reference to the drawing.

FIRST EMBODIMENT

Referring to FIG. 1, a fuel supply apparatus 10 of the first embodiment is fixed to a fuel tank 90 (FIG. 3) of a motor-bicycle, for example. A cover member 12 of the fuel supply apparatus 10 is provided to close an opening of the fuel tank 90. The cover member 12 is made of resin. A fuel pump 50 and a suction filter 52 are located in an inside of the fuel tank 90 and supported by the cover member 12. The fuel pump 50 employs a brushless motor as a motor.

The cover member 12 is provided with a discharge pipe 14, a nail (hook portion) 16 as a holding member, and a fuel passage portion 18. A circuit module 20 is mounted on the cover member 20. The discharge pipe 14 leads a fuel discharged from the fuel pump 50 to an outside of the fuel tank 90. The nail 16 holds a housing 22 of the circuit module 20 to prevent the circuit module 20 from separating from the cover member 12. The fuel passage portion 18 protrudes from the cover member 12 and is located in the inside of the fuel tank 90. The fuel passage portion 18 communicates with a discharge port of the fuel pump 50, and thereby to lead the fuel discharged from the fuel pump 50 to the discharge pipe 14.

Figure 2A:
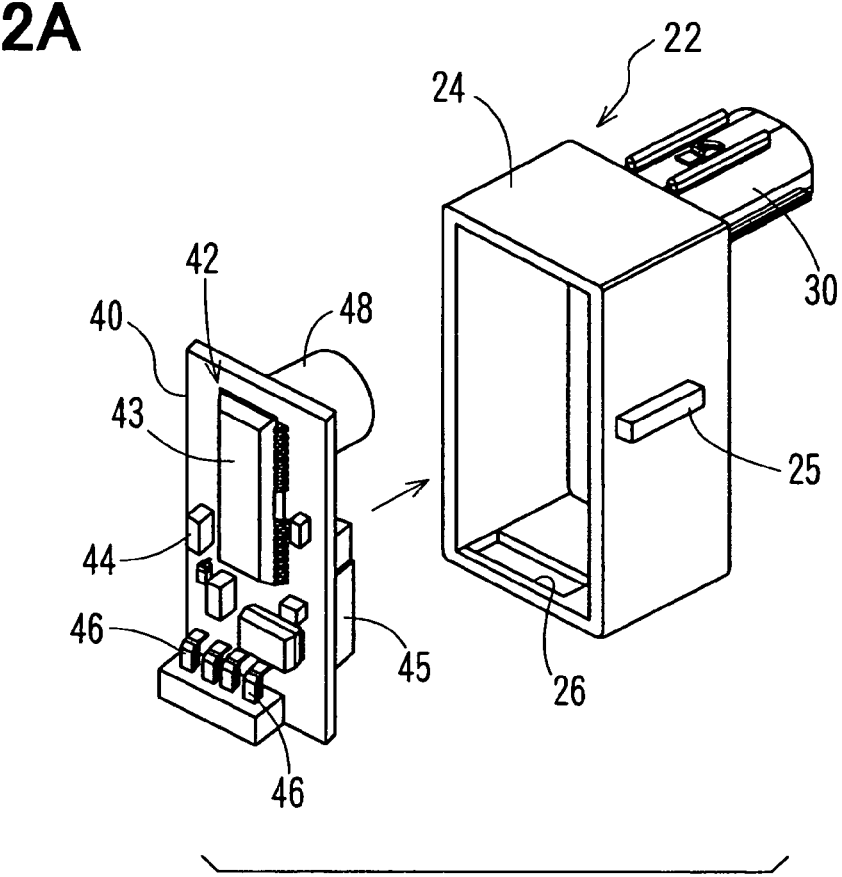
FIG. 2A is an exploded perspective view of a circuit module, in which a driving circuit is removed from a housing body, according to the first embodiment of the present invention.
Figure 2B:
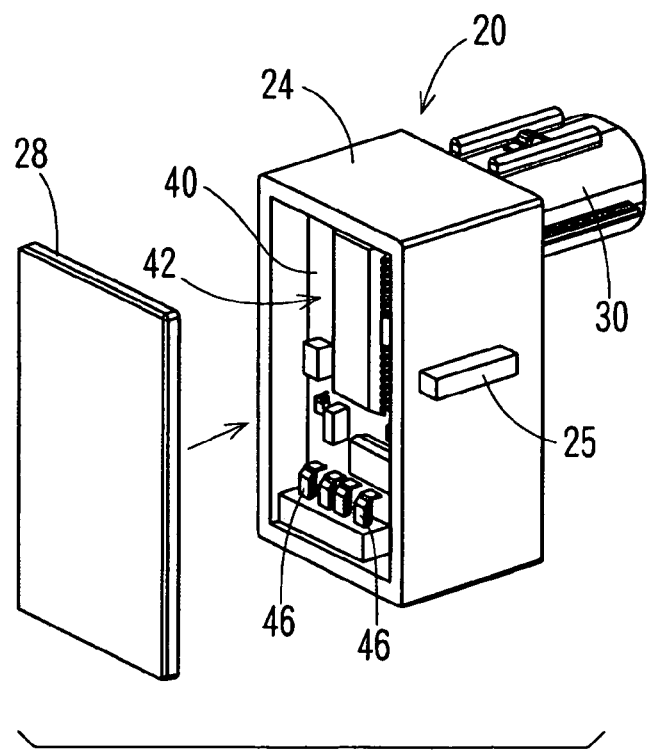
FIG. 2B is an exploded perspective view of the circuit module, in which a housing cover is removed from the housing body, according to the first embodiment of the present invention.

As shown in FIGS. 2A and 2B, the circuit module 20 is provided with the housing 22, an electric connector 30, a driving circuit 42 and the like. The housing 22 is made of resin, and is constructed of a housing body 24 and a housing cover 28. Also, the housing 22 contains the driving circuit 42 therein. The housing body 24 has a projection 25 on its outer surface on a side opposite to the discharge pipe 14. The projection 25 has a stick shape.

Further, resinous parts of the housing body 24 and the electric part 30 are integrally molded, so the housing body 24 and the electric connector 30 are formed as a single member. The housing body 24 forms a rectangular-shaped through hole 26 in its bottom wall. Three-pole terminals (e.g. terminals 72 of an electric connector 70 shown in FIG. 4) are insert-molded in the electric connector 30. The electric connector 30 supplies electric power to the driving circuit 42 from an external power source.

The driving circuit 42 is provided to supply a driving current to the brushless motor of the fuel pump 50. The driving circuit 42 is mounted on a printed board 40. The driving circuit 42 includes a driver 43, a matching element 44 for deciding a motor constant, a protection network for preventing excess current, and the like. Further, pump terminals 46 and a connector 48 are provided on the printed board 40. The pump terminals 46 electrically connect to the fuel pump 50. The connector 48 electrically connects to the electric connector 30.

Specifically, terminals of the connector 48 are electrically and directly connected to terminals of the electric connector 30 in a condition that the printed board 40 mounting the driving circuit 42 is placed in the housing body 24, as shown in FIG. 2B. Also, the pump terminals 46 expose to the outside of the housing body 24 through the through hole 26.

In the condition that the printed board 40 is placed in the housing body 24 as shown in FIG. 2B, urethane resin is filled in the housing body 24 to provide air-tightness of the housing body 24. Further, the housing cover 28 is fixed to the housing body 24 by heat plate welding, so the housing body 24 is sealed.

Figure 3A:
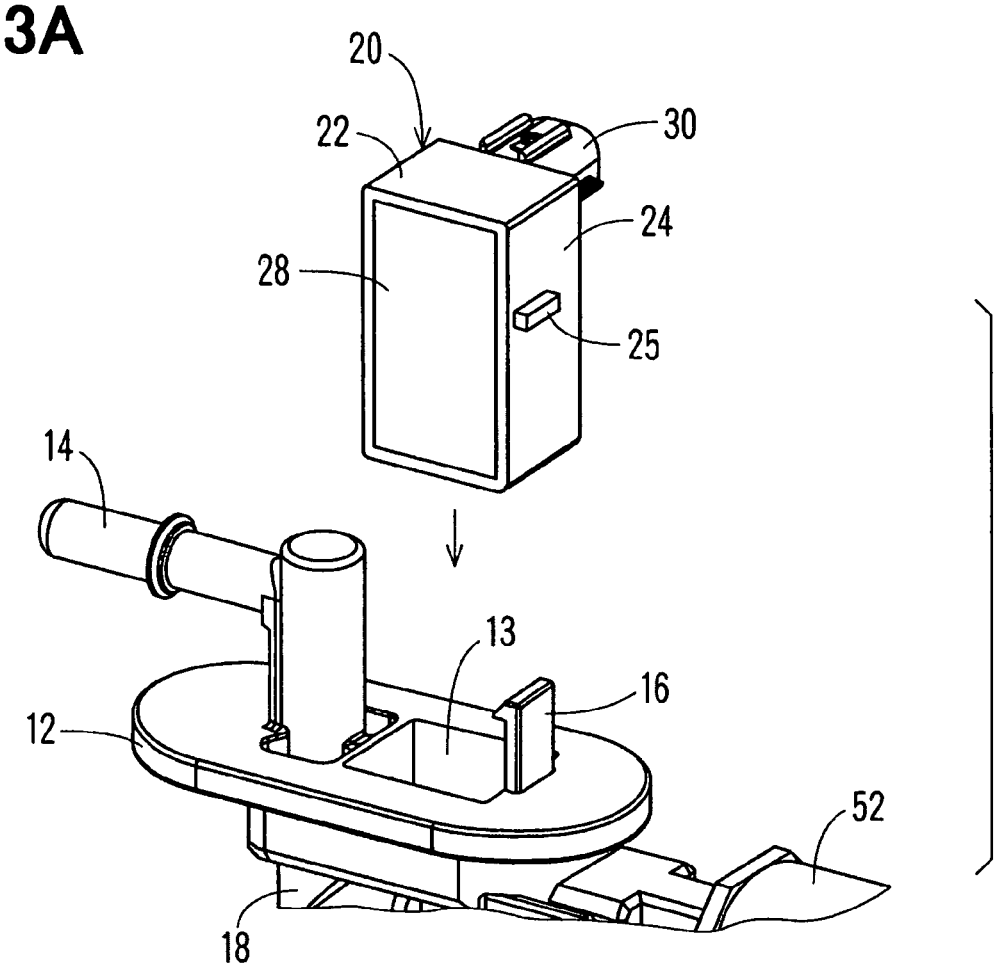
FIG. 3A is an exploded perspective view of the fuel supply apparatus, in which the circuit module is removed from a cover member, according to the first embodiment of the present invention.
Figure 3B:
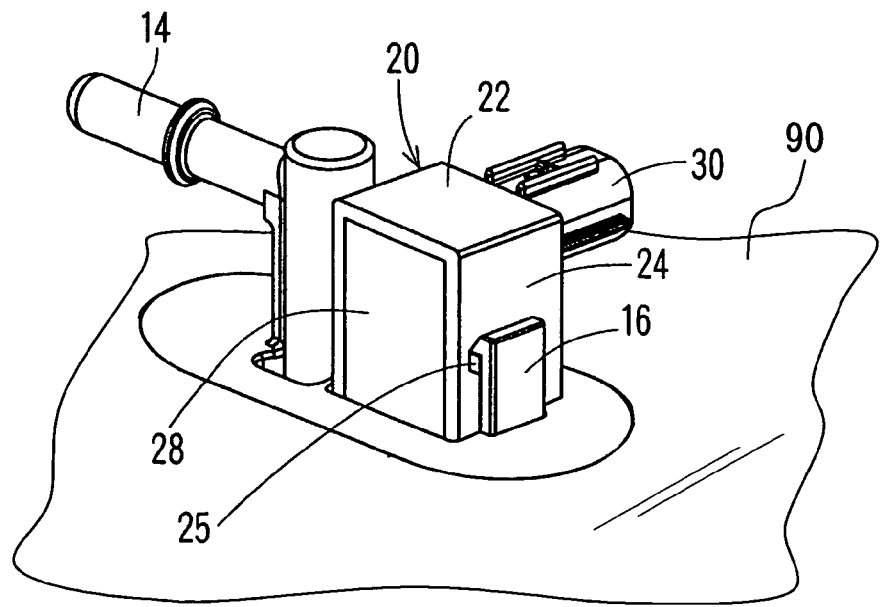
FIG. 3B is a perspective view of the fuel supply apparatus mounted to a fuel tank according to the first embodiment of the present invention.

The circuit module 20 assembled in the above manner is received in a recessed portion 13 formed in the cover member 12, as shown in FIGS. 1 and 3A. At this time, the nail 16 engages with the projection 25 of the housing body 24, thereby preventing the housing 22 from separating from the cover member 12. At the bottom of the recessed portion 13, pump terminals (not shown), which electrically connect to the fuel pump 50, are provided. Therefore, the pump terminals 46 of the circuit module 20 are electrically connected to the pump terminals of the cover member 12 in a condition that the circuit module 20 is received in the recess 13 of the cover member 12, as shown in FIG. 1.

SECOND EMBODIMENT

Figure 4A:
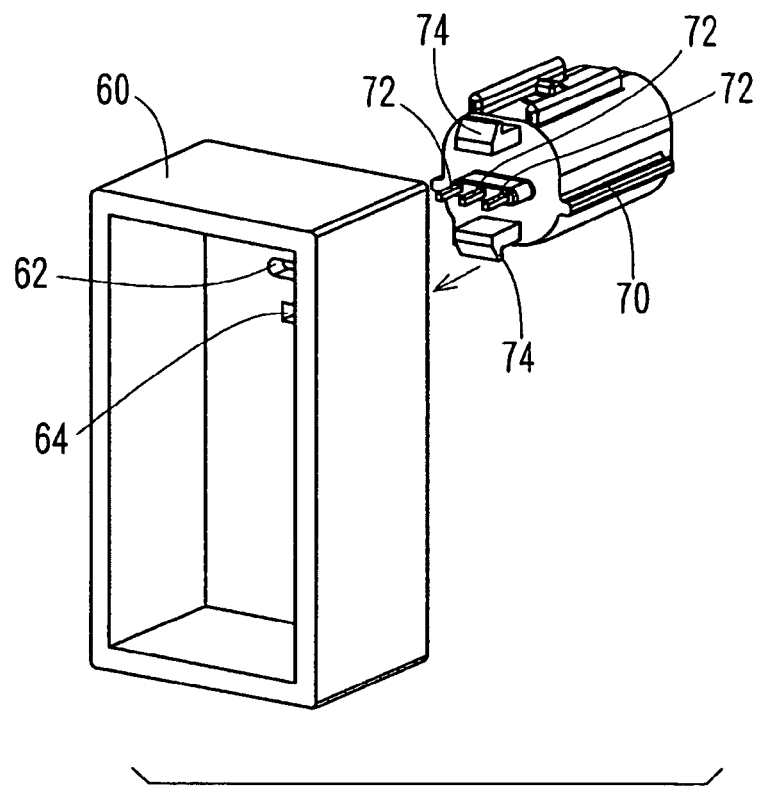
FIG. 4A is an exploded perspective view of a housing body and an electric connector according to a second embodiment of the present invention.
Figure 4B:
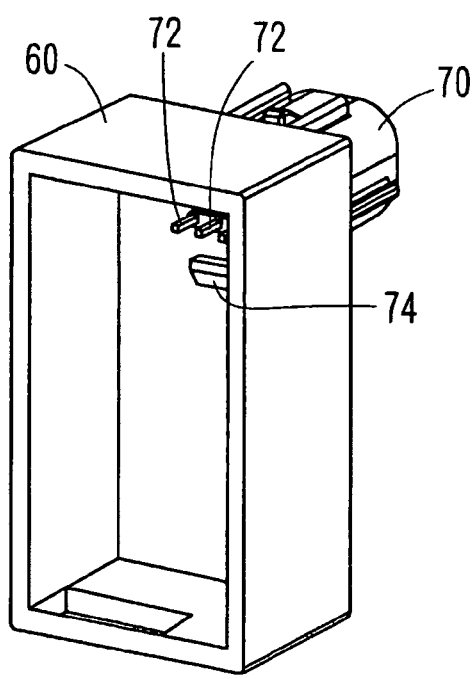
FIG. 4B is a perspective view of the housing on which the electric connector is connected according to the second embodiment of the present invention.

In the second embodiment, an electric connector is provided as a separate member. Referring to FIGS. 4A and 4B, a housing body 60 of the housing and an electric connector 70 are provided as separate members, and joined to each other. Structures of the second embodiment other than the housing body 60 and the electric connector 70 are substantially the same as those of the first embodiment.

The housing body 60 forms a first window (hole) 62, and a pair of second windows (holes) 64 on a side of the electric connector 70. The first window 62 is located between the pair of second windows 64. The electric connector 70 has terminals 72 and a pair of nails 74. The terminals 72 are located between the pair of nails 72, as shown in FIG. 4A. When the electric connector 70 is connected to the housing body 60, the terminals 72 enter the housing body 60 through the first window 62. Also, the nails 74 are fitted and held in the second windows 64, respectively. After the electric connector 70 is integrated with the housing body 60 of the housing, the printed board 40 mounting the driving circuit 42 is placed in the housing body 60 and the housing body 60 is sealed with the housing cover 28, in a manner similar to the first embodiment. In this way, the circuit module is assembled.

In the first and second embodiments, the housing and the electric connector are integrated as a single module, irrespective of whether the housing and the electric connector are produced by a single part or separate parts. Further, the circuit module is constructed by containing the driving circuit 42, which supplies the driving current to the fuel pump, within the housing 22. In this way, the driving circuit 42, the housing 22, 60, and the electric connector 30, 70 are integrated into the circuit module, before mounted to the cover member 12. Therefore, the size of the circuit module 20 is reduced.

Further, since the driving circuit 42 is arranged close to the electric connector 30, 70, a connection distance between the driving circuit 42 and the electric connector 30, 70 is shortened. As a result, the driving circuit 42 and the electric connector 30, 70 are easily connected, and the size of the circuit module 20 becomes small. Accordingly, this compact circuit module 20 is easily fixed to the cover member 12. With the size reduction of the circuit module 20, the size of the cover member 12 can be reduced.

In a small fuel tank of such as a motor-bicycle, it is difficult to enlarge an opening that receives a pump module having the fuel pump and the suction filter. Therefore, the compact fuel supply apparatus 10, which can reduce the size of the cover member 12 as the above, is suitably used in such a small fuel tank.

In the above embodiments, for example, a part of the discharge pipe 14 extends through the cover member 12, and the circuit module is received in the recess 13 of the cover member 12 along the part of the discharge pipe 14. Further, the longitudinal direction of the housing 30, 60 is substantially perpendicular to the cover member 12. With this arrangement, the size of the circuit module is reduced.

In addition, the electric connector 30, 70 is located on a wall of the housing body 24, 60 on a side opposite to the opening of the housing body 24, 60 that is covered with the housing cover 28. Therefore, the terminals of the connector 48 are easily connected to the terminals 72 of the electric connector 30, 70, when the printed board 40 is placed in the housing body 24, 60.

OTHER EMBODIMENT

In the above-described embodiments, the terminals of the driving circuit 42 are electrically and directly connected to the terminals of the electric connector 30, 70. However, those terminals can be connected through other members such as lead wires.

Also, the brushless motor is used as a motor of the fuel pump, and the driving circuit is constructed to supply the driving current to the brushless motor. Alternatively, a brush motor can be used. In this case, the driving circuit supplies the driving current to the brush motor.

The present invention is not limited to the above embodiments, but may be implemented in other ways without departing from the spirit of the invention.

What is claimed is:

1. A fuel supply apparatus mounted to a fuel tank for supplying fuel in the fuel tank to a location outside of the fuel tank, the fuel supply apparatus comprising:
   a cover member disposed to close an opening of the fuel tank;
   a fuel pump supported by the cover member and located inside the fuel tank;
   a housing mounted to the cover member;
   a driving circuit contained in the housing for supplying a driving current to the fuel pump; and
   an electric connector electrically connected to the driving circuit, wherein the electric connector is integrated with and integrally molded with the housing.

2. The fuel supply apparatus according to claim 1, wherein the cover member has a holding portion that holds the housing to prevent the housing from separating from the cover member.

3. The fuel supply apparatus according to claim 1, wherein
   the driving circuit has a circuit terminal and the electric connector has a connector terminal, and the circuit terminal and the connector terminal are directly connected in a condition that the driving circuit is contained in the housing.

4. The fuel supply apparatus according to claim 1, wherein the cover member forms a recessed portion, and the housing is partly received in the recessed portion.

5. The fuel supply apparatus according to claim 4, wherein the housing is received in the recessed portion of the cover member such that a longitudinal direction of the housing is perpendicular to the cover member.

6. A fuel supply apparatus mounted to a fuel tank for supplying fuel in the fuel tank to a location outside of the fuel tank, the fuel supply apparatus comprising:
- a cover member disposed to close an opening of the fuel tank;
- a fuel pump supported by the cover member and located inside the fuel tank;
- a housing mounted to the cover member;
- a driving circuit contained in the housing for supplying a driving current to the fuel pump; and
- an electric connector electrically connected to the driving circuit, wherein the electric connector is integrated with the housing;
- wherein the electric connector is connected to the housing before the housing is mounted to the cover member.

7. The fuel supply apparatus according to claim 1, wherein
- the housing has a housing body that forms an opening on a side and contains the driving circuit therein and a housing cover disposed to close the opening of the housing body, and
- the electric connector is located on a wall of the housing body on a side opposite to the housing cover.

8. The fuel supply apparatus according to claim 7, wherein
- the electric connector has a connector terminal that passes through the wall of the housing body and is directly connected to a terminal of the driving circuit.

9. A fuel supply apparatus mounted to a fuel tank for supplying fuel in the fuel tank to a location outside of the fuel tank, the fuel supply apparatus comprising
- a cover member disposed to close an opening of the fuel tank;
- a fuel pump supported by the cover member and located inside the fuel tank;
- a housing mounted to the cover member;
- a driving circuit contained in the housing for supplying a driving current to the fuel pump;
- an electric connector electrically connected to the driving circuit, wherein the electric connector is integrated with and integrally molded with the housing; and
- a discharge pipe through which fuel discharged from the fuel pump flows, wherein
  - the discharge pipe includes a first portion that extends through the cover member and a second portion that extends from the first portion, and
  - the housing is mounted to the cover member along the first portion of the discharge pipe.

10. The fuel supply apparatus mounted to a fuel tank for supplying fuel in the fuel tank to a location outside of the fuel tank, the fuel supply apparatus comprising:
- a cover member disposed to close an opening of the fuel tank;
- a fuel pump supported by the cover member and located inside the fuel tank;
- a housing mounted to the cover member;
- a driving circuit contained in the housing for supplying a driving current to the fuel pump;
- wherein the cover member has a holding portion that holds the housing to prevent the housing from separating from the cover member; and
- wherein the housing has a projection, and the holding portion extends from the cover member and forms a hook at its end to engage with the projection of the housing.

* * * * *